(12) United States Patent
Lee

(10) Patent No.: US 12,276,310 B2
(45) Date of Patent: Apr. 15, 2025

(54) BRAKE APPARATUS FOR VEHICLE

(71) Applicant: HYUNDAI MOBIS Co., Ltd., Seoul (KR)

(72) Inventor: Jong Min Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 376 days.

(21) Appl. No.: 17/856,757

(22) Filed: Jul. 1, 2022

(65) Prior Publication Data

US 2023/0011350 A1  Jan. 12, 2023

(30) Foreign Application Priority Data

Jul. 7, 2021  (KR) .................. 10-2021-0089027

(51) Int. Cl.
*F16D 65/09* (2006.01)
*F16D 55/22* (2006.01)
*F16D 65/097* (2006.01)

(52) U.S. Cl.
CPC .............................. *F16D 65/0972* (2013.01)

(58) Field of Classification Search
CPC ............. F16D 65/0972; F16D 65/0977; F16D 65/0978; F16D 65/097; F16D 55/226; F16D 2121/16; F16D 2055/0041; F16D 2055/007

See application file for complete search history.

(56) References Cited

U.S. PATENT DOCUMENTS

| | | | | |
|---|---|---|---|---|
| 5,901,815 A | * | 5/1999 | Kobayashi | F16D 65/0972 188/205 A |
| 5,954,163 A | * | 9/1999 | Suzuki | F16D 55/227 188/73.38 |
| 6,269,915 B1 | * | 8/2001 | Aoyagi | F16D 65/0972 188/73.38 |
| 6,478,122 B1 | * | 11/2002 | Demoise, Jr. | F16D 65/0977 188/73.38 |
| 7,455,153 B2 | * | 11/2008 | Ooshima | F16D 65/0979 188/73.38 |
| 9,506,514 B1 | * | 11/2016 | Tekesky | F16D 55/226 |
| 9,689,445 B2 | * | 6/2017 | Merrien | F16D 55/228 |
| 10,030,729 B2 | * | 7/2018 | Foucoin | F16D 65/543 |
| 10,563,716 B2 | * | 2/2020 | Foucoin | F16D 55/227 |
| 11,209,056 B2 | * | 12/2021 | Salzmann | F16D 55/226 |
| 11,428,282 B2 | * | 8/2022 | Lee | F16D 65/097 |
| 2004/0195057 A1 | * | 10/2004 | Ooshima | F16D 65/0972 188/73.38 |
| 2013/0192939 A1 | * | 8/2013 | V. | F16D 65/0972 188/73.38 |

(Continued)

FOREIGN PATENT DOCUMENTS

KR  10-2009-0078675 A  7/2009

*Primary Examiner* — Bradley T King
*Assistant Examiner* — James K Hsiao
(74) *Attorney, Agent, or Firm* — Morgan, Lewis & Bockius LLP

(57) ABSTRACT

A brake apparatus for a vehicle according to the present disclosure includes a torque member configured to surround a brake disk, a pair of brake pads disposed in the torque member in a way to face each other, and a plurality of return parts mounted on the pair of brake pads, respectively, coupled with the torque member, and configured to guide movements of the brake pads and return the brake pads to their original positions by elastic restoring forces thereof.

5 Claims, 12 Drawing Sheets

(56) References Cited

U.S. PATENT DOCUMENTS

| | | | |
|---|---|---|---|
| 2014/0131148 A1* | 5/2014 | Plantan | F16D 65/0972 188/73.31 |
| 2014/0311839 A1* | 10/2014 | Bernard | F16D 65/0972 188/250 F |
| 2015/0211589 A1* | 7/2015 | Mallmann | F16D 65/0977 188/73.38 |
| 2018/0023643 A1* | 1/2018 | Foucoin | F16D 65/40 188/73.32 |
| 2018/0051760 A1* | 2/2018 | Foucoin | F16D 65/0979 |
| 2019/0226539 A1* | 7/2019 | Kim | F16D 65/0972 |
| 2021/0062878 A1* | 3/2021 | Lee | F16D 65/097 |
| 2021/0172488 A1* | 6/2021 | Park | F16D 65/0977 |
| 2021/0262542 A1* | 8/2021 | Inoue | F16D 65/0972 |

\* cited by examiner

BRAKE APPARATUS FOR VEHICLE

CROSS-REFERENCE TO RELATED APPLICATION

This application claims the benefit under 35 U.S.C. § 119(a) of priority to Korean Patent Application No. 10-2021-0089027 filed on Jul. 7, 2021 in the Korean Intellectual Property Office, the entire disclosure of which is incorporated herein by reference for all purposes.

BACKGROUND

Technical Field

Exemplary embodiments of the present disclosure relate to a brake apparatus for a vehicle, and more particularly, to a brake apparatus for a vehicle, which can reduce the number of parts, simplify an assembly process, improve durability, and reduce noise upon operation.

Discussion of the Background

In general, the caliper of a brake apparatus for braking is closely attached to a brake disk when a pedal is pressurized, and provides a braking power. The caliper includes a plurality of parts.

A pad liner among the parts of the caliper is mounted on a torque member and is equipped with return parts for elastically restoring brake pads to their original positions. However, there is a problem in that a lot of a processing and assembly time and expense are required because the torque member needs to be processed in order to mount the pad liner on the torque member. Furthermore, there are problems in that the return parts of the pad liner are subject to plastic deformation because the durability of the return parts is reduced due to repeated operations thereof and the area of the brake pad may be lost due to a shape that protrudes toward the brake pad. Furthermore, there are problems in that there occurs a phenomenon in which the brake pad is inclined to one side due to a gap occurring between the brake pad and the pad liner and noise occurs when the brake pad operates. Accordingly, there is a need to improve such problems.

The background technology of the present disclosure is disclosed in Korean Patent Application Publication No. 10-2009-0078675 published on Jul. 20, 2009 and entitled "Break Device for Vehicles".

SUMMARY

Various embodiments are directed to a brake apparatus for a vehicle, which can reduce the number of parts, simplify an assembly process, improve durability, and reduce noise upon operation.

In an embodiment, a brake apparatus for a vehicle includes a torque member to surround a brake disk, a pair of brake pads disposed in the torque member in a way to face each other, and a plurality of return parts mounted on the pair of brake pads, coupled with the torque member, guides movements of the brake pads and returns the brake pads to their original positions by elastic restoring forces thereof.

Furthermore, each of the return parts includes a return mounting part mounted on one of the pair of brake pads, a return spring connected to the return mounting part and returns the one of the pair of brake pads to its original position by the elastic restoring force thereof, and a return coupling part connected to the return spring and coupled with the torque member.

Furthermore, an elastic induction part to induce elastic deformation is disposed in the return spring.

Furthermore, each of the plurality of return parts further includes an elastic support part connected to the return mounting part, the elastic support part contacts the torque member, and supports the one of the pair of brake pads by pushing the one of the pair of brake pads by the elastic restoring force thereof.

Furthermore, the return coupling part bends and extends from the return spring to the torque member, and is coupled with a coupling groove of the torque member.

Furthermore, each of the pair of brake pads includes a back plate on which the return mounting part is mounted and a friction member connected to the back plate and contacts the brake disk.

Furthermore, the back plate includes a back plate body with which the friction member is coupled and a pad protrusion protruding from each of both sides of the back plate body and to having the return mounting part mounted thereon.

Furthermore, the return mounting part includes one or more coupling holes, and the pad protrusion includes one or more coupling protrusions coupled with the one or more coupling holes.

Furthermore, the one or more coupling protrusions is a pair of coupling protrusions disposed in the pad protrusion in a way to be spaced apart from each other. A number of the one or more coupling holes is the same as a number of the one or more coupling protrusions.

Furthermore, the return mounting part further includes a first return mounting part connected to the return spring and faces a first surface of the pad protrusion, a second return mounting part bending and extending from the first return mounting part in a way to face a second surface of the pad protrusion and having any one of a pair of the one or more coupling holes, a third return mounting part bending from the second return mounting part to one side thereof and surrounds a third surface of the pad protrusion, and a fourth return mounting part bending and extending from the third return mounting part in a way to face a fourth surface of the pad protrusion and having the other of the pair of the one or more coupling holes.

Furthermore, the second surface includes any one of the pair of the coupling protrusions, and the fourth surface includes the other of the pair of coupling protrusions.

The brake apparatus for a vehicle according to the present disclosure has effects in that it can reduce a cost for parts by reducing the number of parts and reduce an assembly time by simplifying an assembly process because the return part plays a role as a pad liner and the pad liner is not required unlike a conventional technology.

Furthermore, the present disclosure has an effect in that the brake pads can be fully spaced apart from the brake disk because the return parts return the brake pads to their original positions by providing elastic restoring forces thereof to the brake pads.

DETAILED DESCRIPTION OF THE ILLUSTRATED EMBODIMENTS

Figure 1:
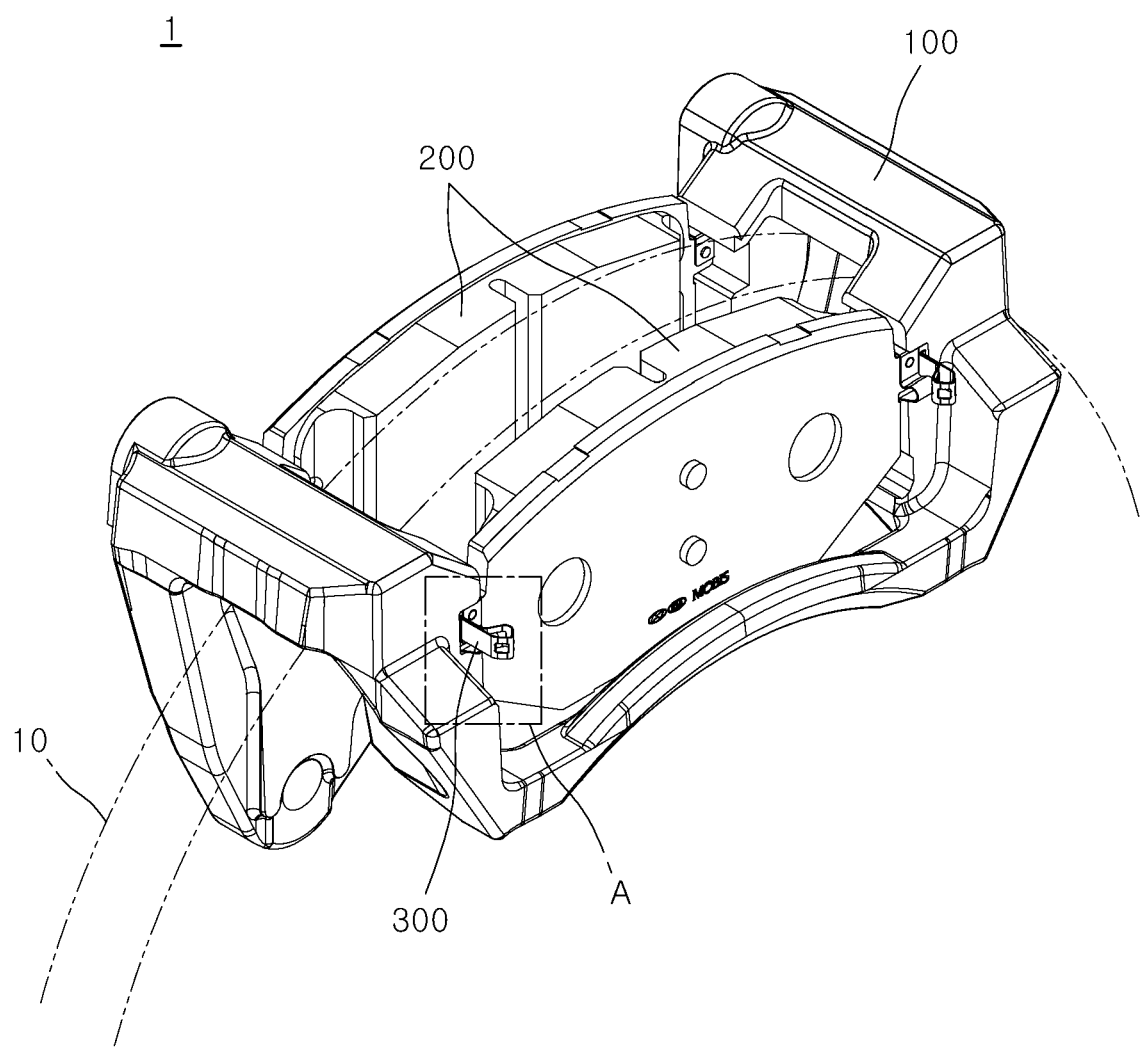
FIG. 1 is a perspective view schematically illustrating a brake apparatus for a vehicle according to an embodiment of the present disclosure.

Hereinafter, a brake apparatus for a vehicle will be described below with reference to the accompanying drawings through various exemplary embodiments.

In such a process, the thicknesses of lines or the sizes of elements illustrated in the drawings may have been exaggerated for the clarity of a description and for convenience' sake. Terms to be described below have been defined by taking into consideration their functions in the present disclosure, and may be changed depending on a user or operator's intention or practice. Accordingly, such terms should be defined based on the overall contents of this specification.

Figure 2:
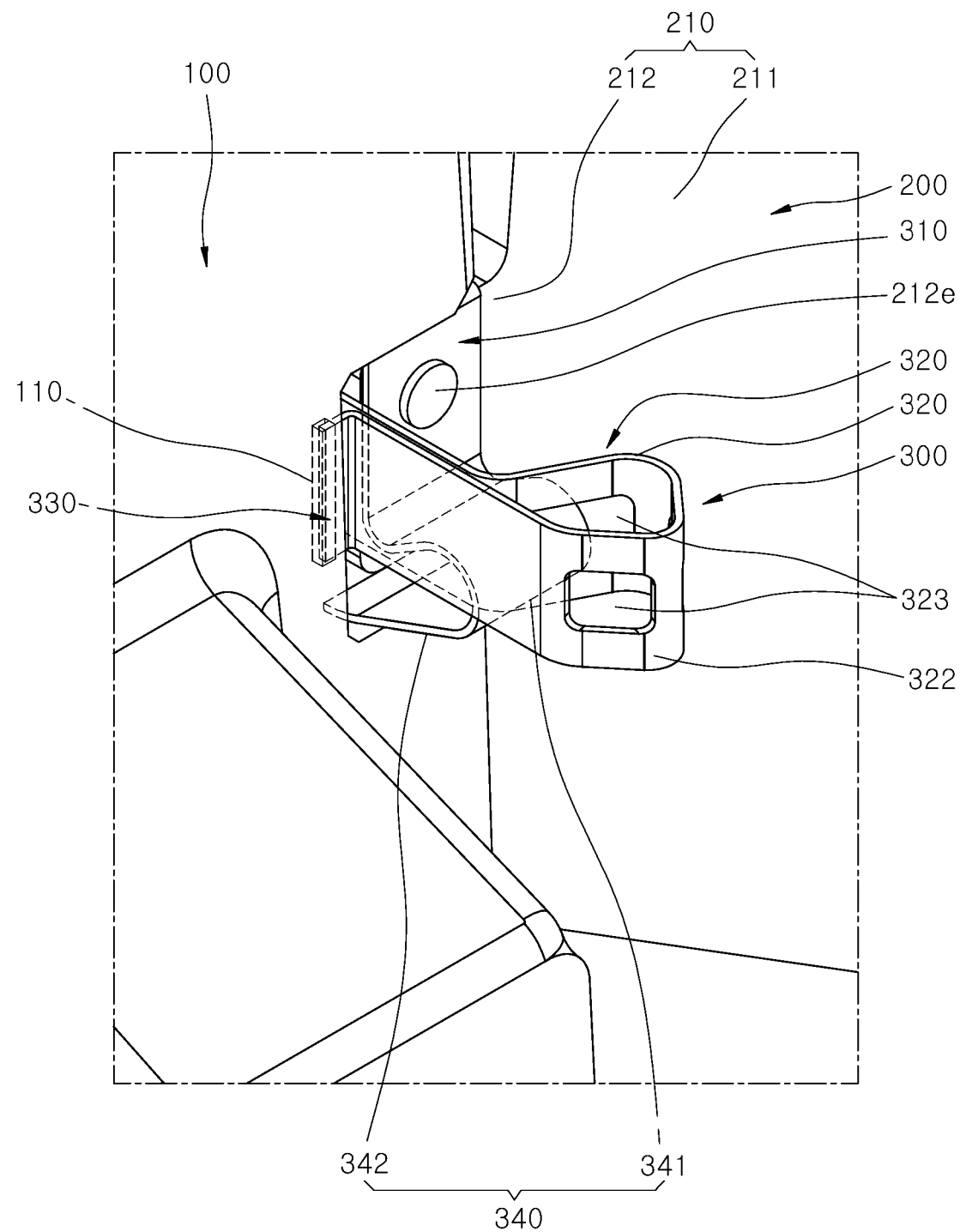
FIG. 2 is an enlarged view of a portion A in FIG. 1.
Figure 3:
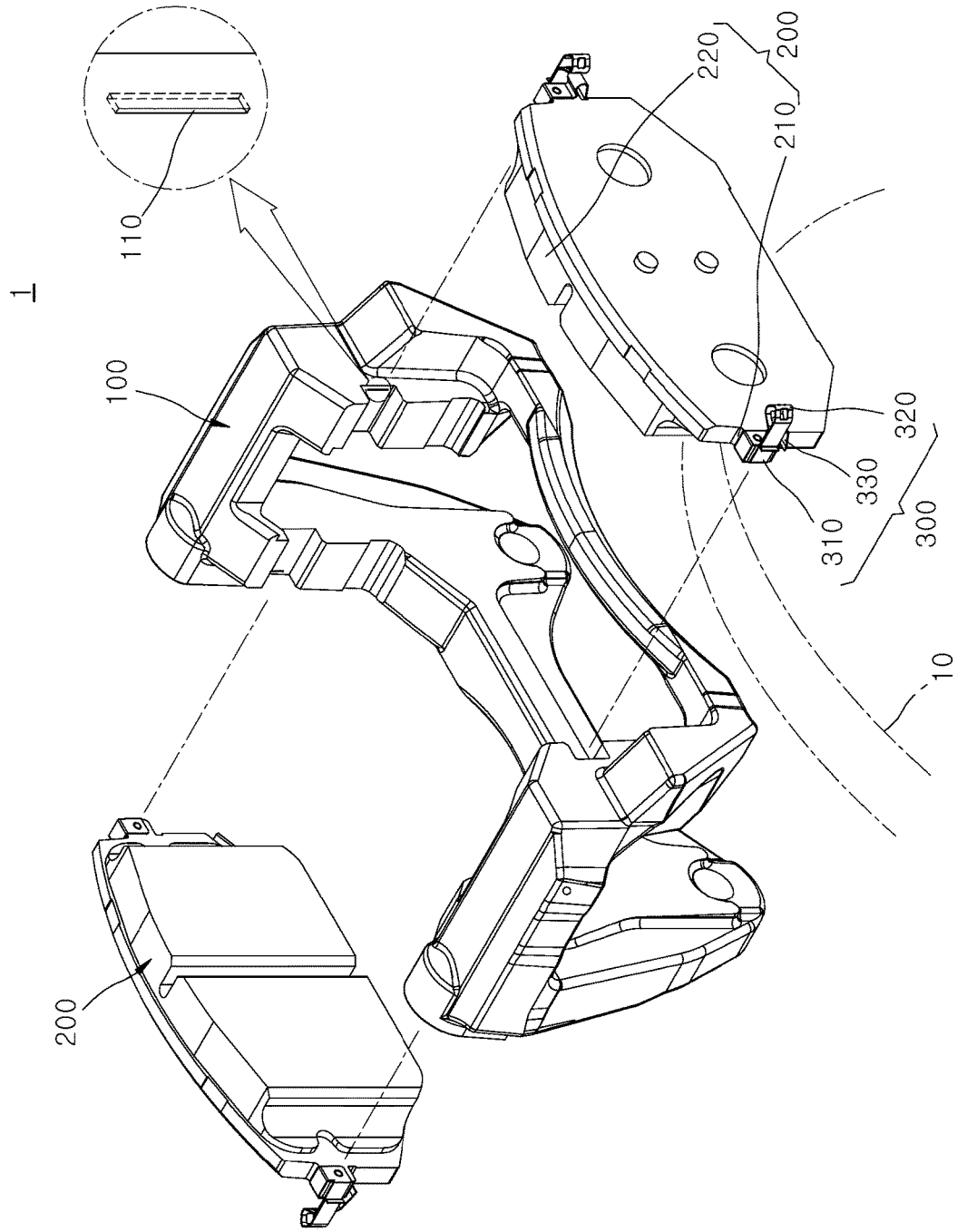
FIG. 3 is an exploded perspective view of the brake apparatus for a vehicle according to an embodiment of the present disclosure.
Figure 4:
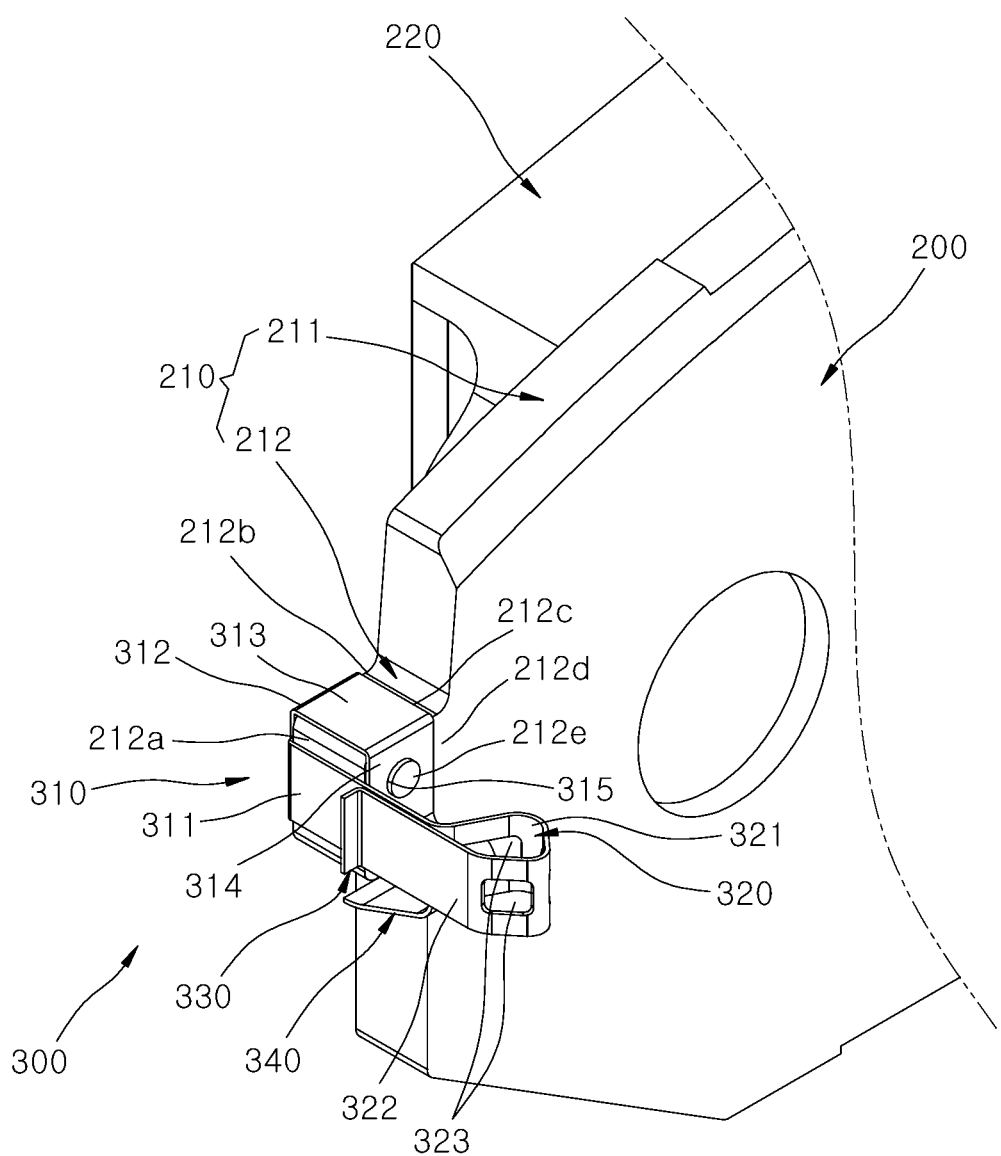
FIG. 4 is an enlarged view of a portion of a return part of the brake apparatus for a vehicle according to an embodiment of the present disclosure.
Figure 5:
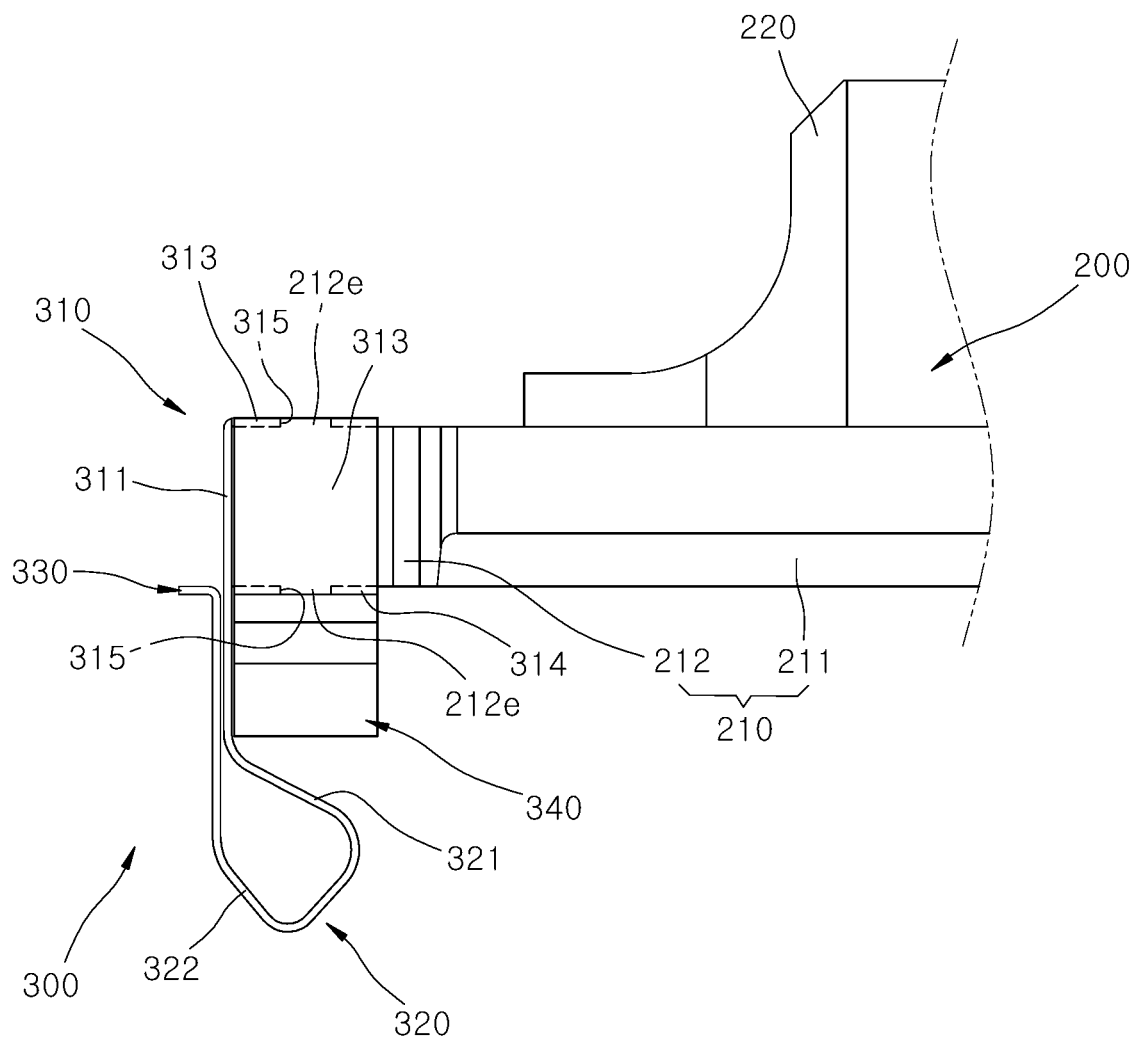
FIG. 5 is a diagram of FIG. 4, which is viewed in another direction.
Figure 6:
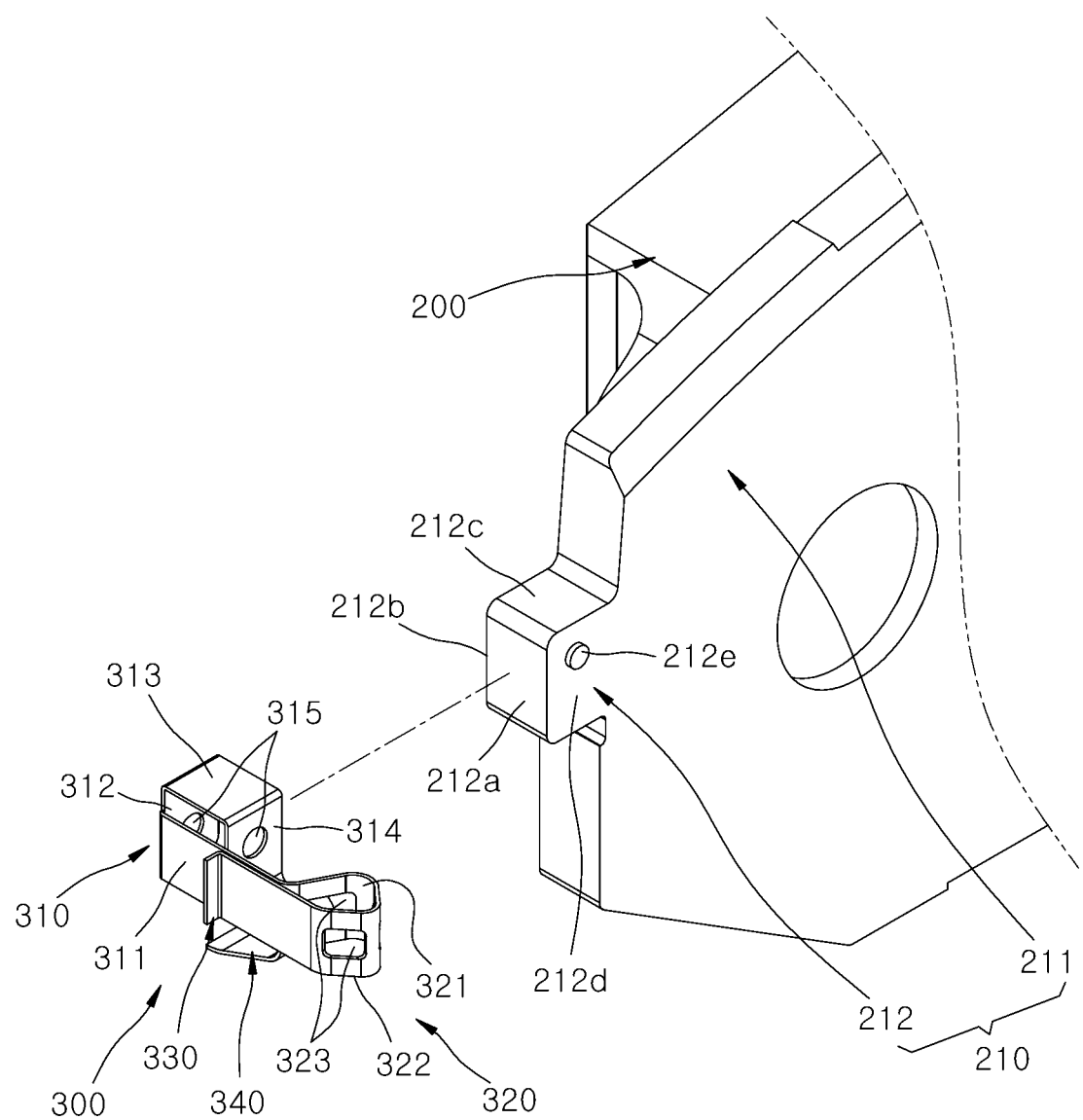
FIG. 6 is an exploded view of the return part in a brake pad of the brake apparatus for a vehicle according to an embodiment of the present disclosure.
Figure 7:
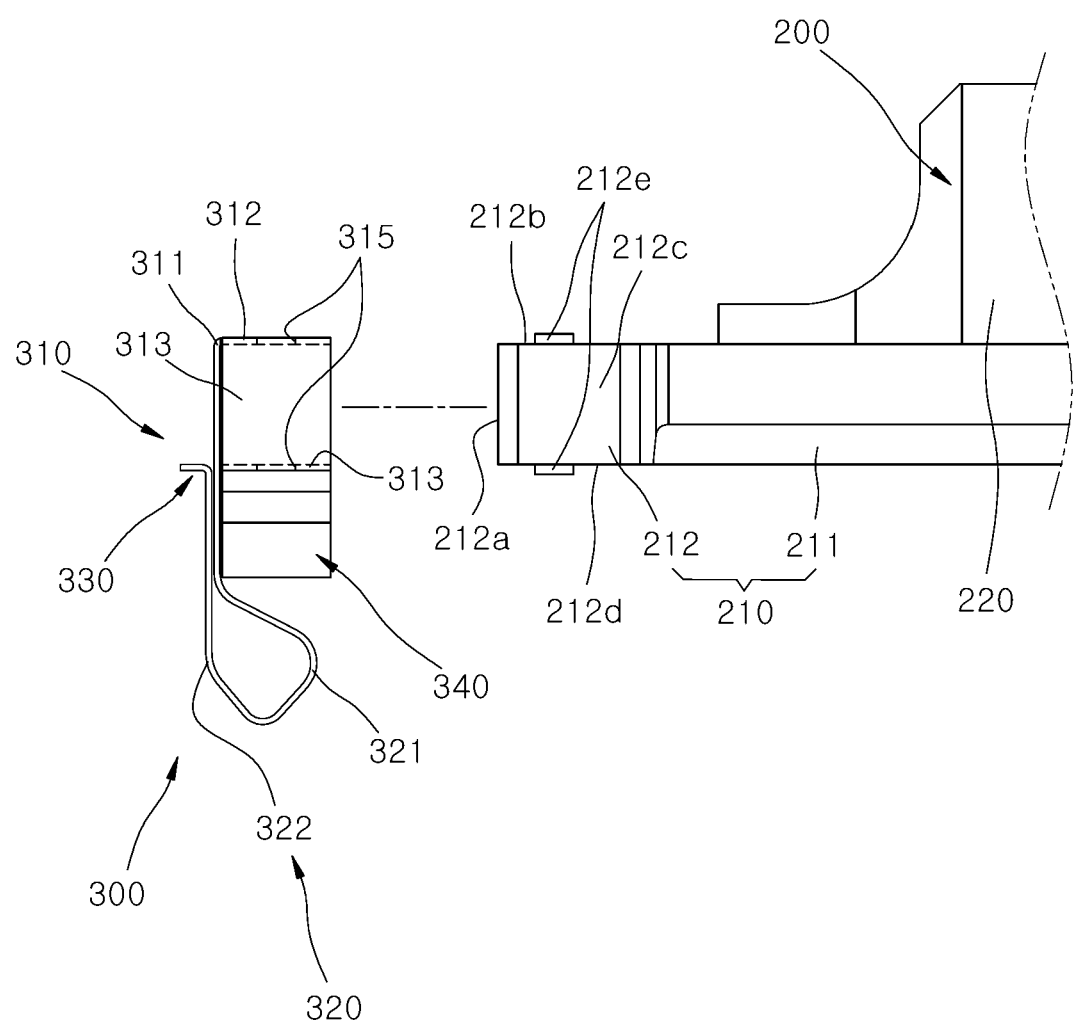
FIG. 7 is a diagram of FIG. 6, which is viewed in another direction.
Figure 8A:
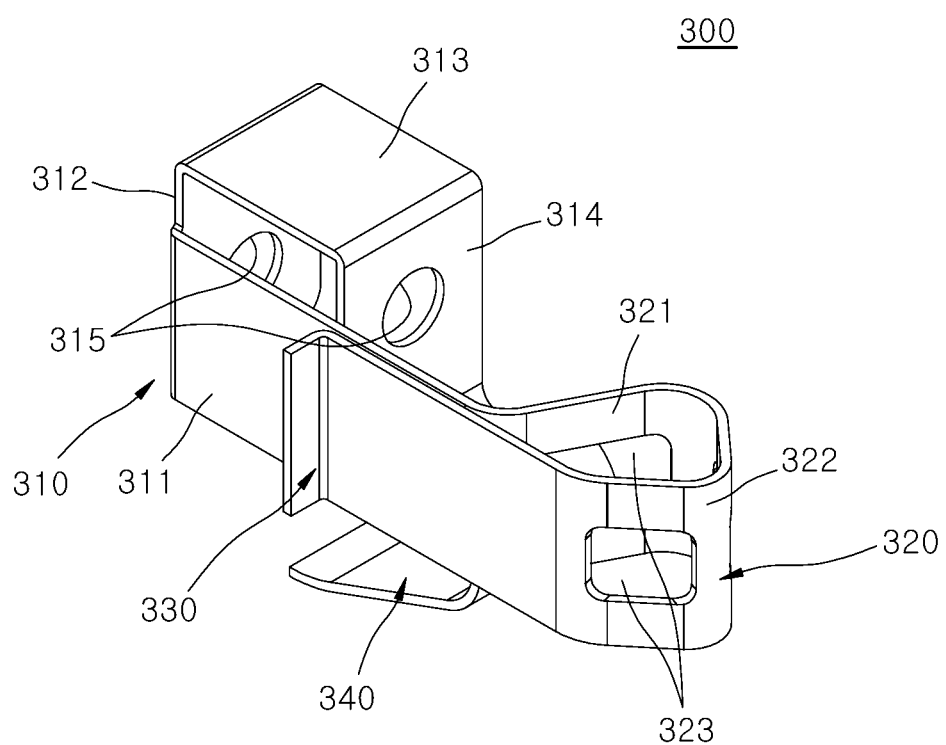
FIGS. 8A and 8B are a perspective view of a return part of the brake apparatus for a vehicle according to an embodiment of the present disclosure.
Figure 8B:
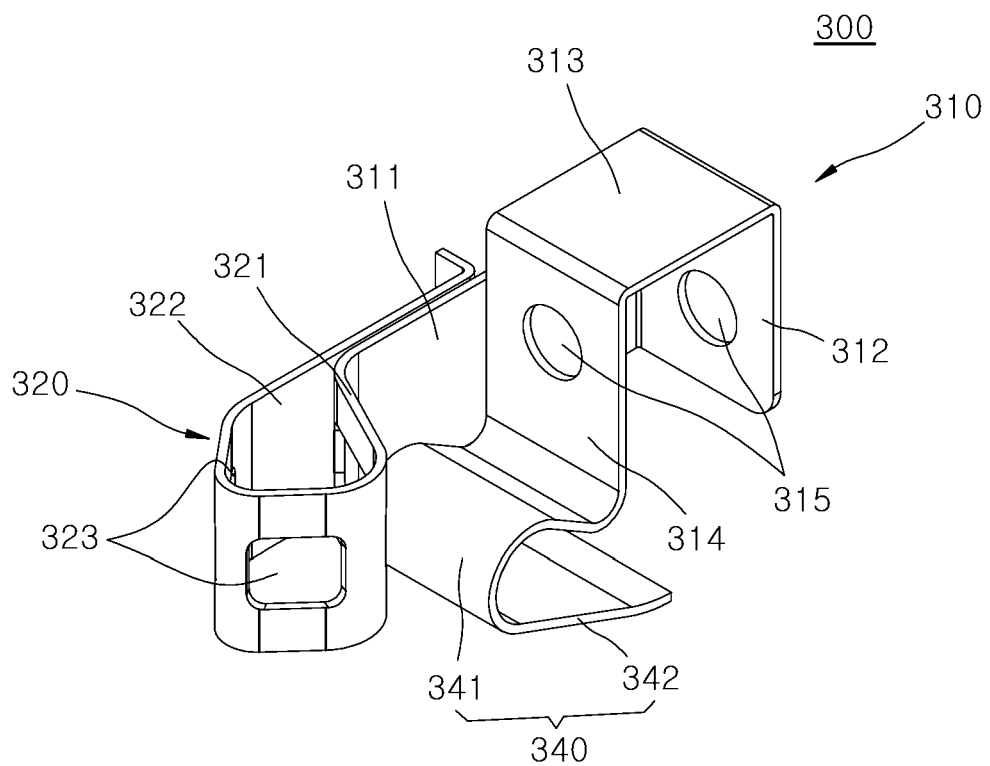
Figure 9:
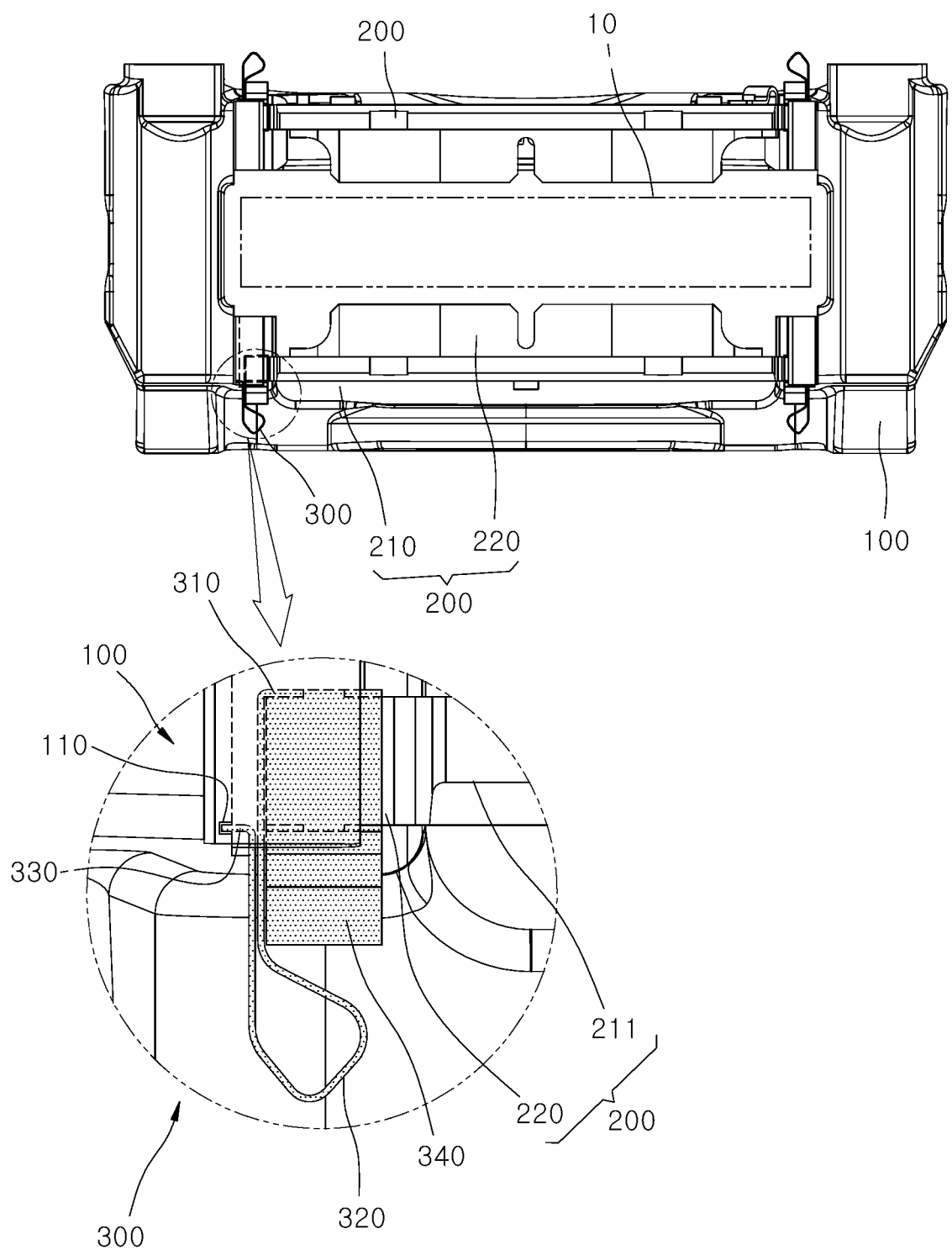
FIG. 9 is a front view of the brake apparatus for a vehicle according to an embodiment of the present disclosure.
Figure 10A:
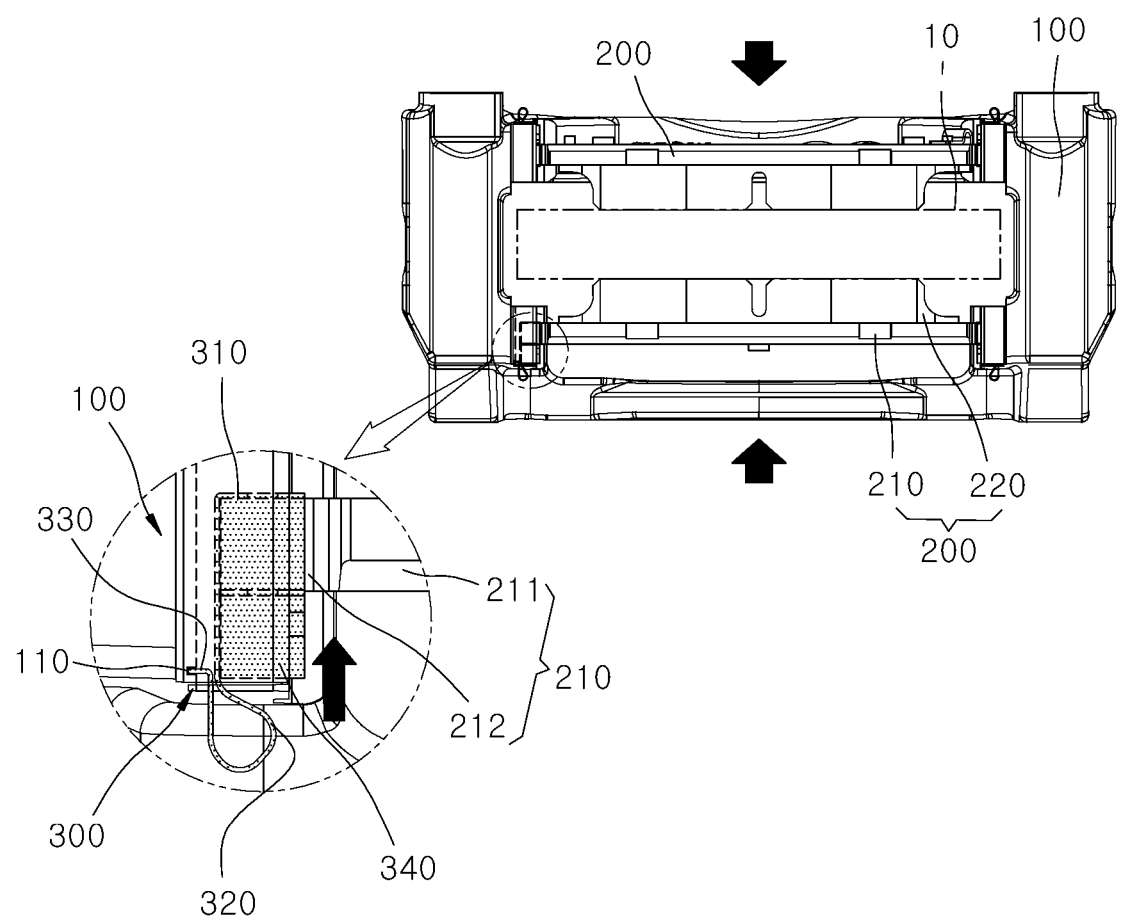
FIGS. 10A and 10B are an operating diagram of the brake apparatus for a vehicle according to an embodiment of the present disclosure.
Figure 10B:
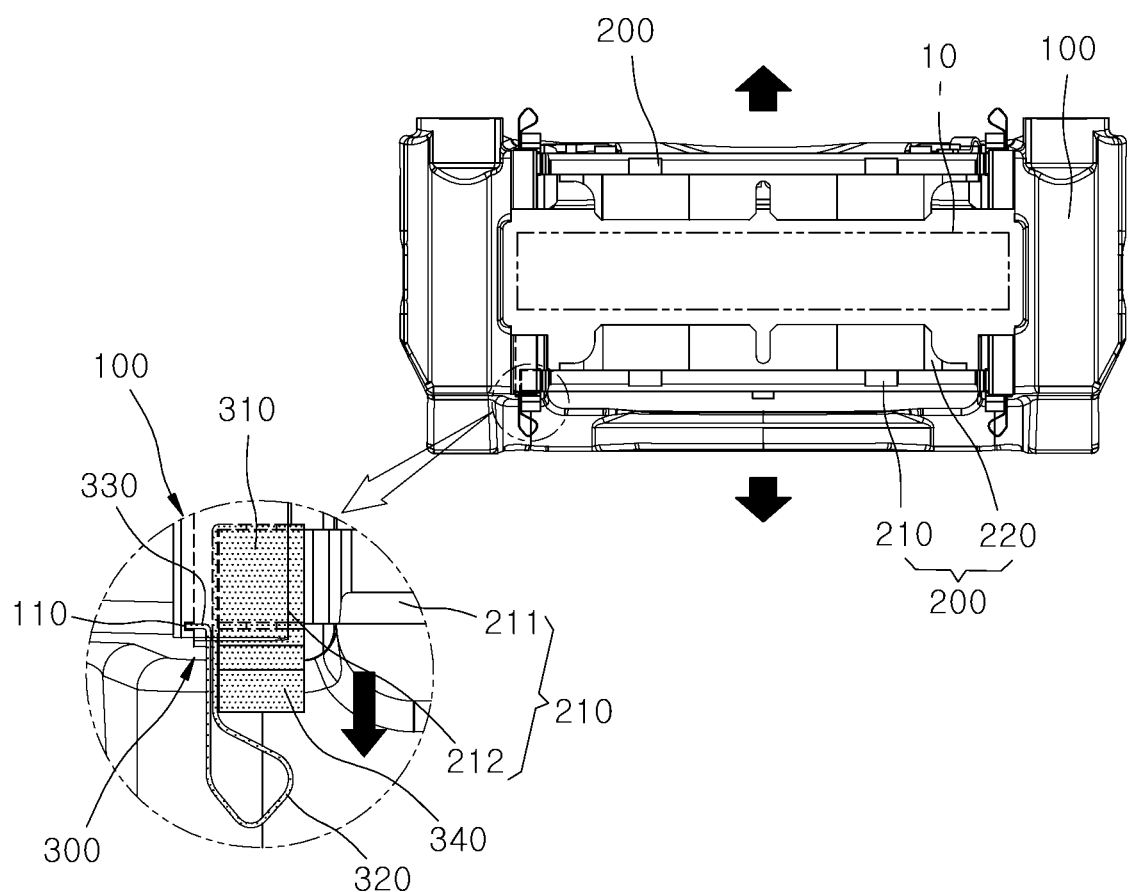

FIG. 1 is a perspective view schematically illustrating a brake apparatus for a vehicle according to an embodiment of the present disclosure. FIG. 2 is an enlarged view of a portion A in FIG. 1. FIG. 3 is an exploded perspective view of the brake apparatus for a vehicle according to an embodiment of the present disclosure. FIG. 4 is an enlarged view of a portion of a return part of the brake apparatus for a vehicle according to an embodiment of the present disclosure. FIG. 5 is a diagram of FIG. 4, which is viewed in another direction. FIG. 6 is an exploded view of the return part in a brake pad of the brake apparatus for a vehicle according to an embodiment of the present disclosure. FIG. 7 is a diagram of FIG. 6, which is viewed in another direction. FIGS. 8A and 8B are a perspective view of a return part of the brake apparatus for a vehicle according to an embodiment of the present disclosure. FIG. 9 is a front view of the brake apparatus for a vehicle according to an embodiment of the present disclosure. FIGS. 10A and 10B are an operating diagram of the brake apparatus for a vehicle according to an embodiment of the present disclosure.

Referring to FIGS. 1 to 9, a brake apparatus 1 for a vehicle according to an embodiment of the present disclosure includes a torque member 100, a pair of brake pads 200, and a plurality of return parts 300. The torque member 100 surrounds a brake disk 10.

The pair of brake pads 200 is disposed in the torque member 100 in a way to face each other. The pair of brake pads 200 is disposed on both sides of the brake disk 10, respectively. When being applied by an external force, the pair of brake pads 200 is moved on the torque member 100 toward the brake disk 10 and closely attached to the brake disk 10.

The plurality of return parts 300 is mounted on the pair of brake pads 200, and coupled with the torque member 100. The plurality of return parts 300 guides movements of the brake pads 200 and returns the brake pads 200 to their original positions by elastic restoring forces thereof. In this case, the return parts 300 are mounted on the torque member 100.

Specifically, the return parts 300 are mounted on both sides of the brake pad 200, respectively. When the return parts 300 provide an external force to the brake pads 200, the brake pads 200 are moved toward the brake disk 10 by the return parts 300. At this time, the return parts 300 are elastically deformed.

Contrariwise, when the external force provided to the brake pads 200 is released, the brake pads 200 are moved toward a side opposite to the brake disk 10 by the return parts 300. At this time, the return parts 300 are restored to their original states by their elastic restoring forces. That is, the return parts 300 provide the elastic restoring forces to the brake pads 200 so that the brake pads 200 are spaced apart from the brake disk 10.

In the brake apparatus 1 for a vehicle according to the present disclosure, the return parts 300 play a role as pad liners, and return the brake pads 200 to their original positions by providing elastic restoring forces to the brake pads 200. Accordingly, since a pad liner is not required unlike a conventional technology, a cost for parts can be reduced because the number of parts is reduced and an assembly time can be reduced because an assembly process is simplified.

The return part 300 includes a return mounting part 310, a return spring 320, and a return coupling part 330. The return mounting part 310 is mounted on the brake pad 200. The return mounting part 310 is coupled with a back plate 210 of the brake pad 200.

The return spring 320 is connected to the return mounting part 310, and returns the brake pad 200 to its original position by an elastic restoring force thereof. When an external force applied to the brake pad 200 is removed through a cylinder (not illustrated), the return spring 320 allows the brake pad 200 to be spaced apart from the brake disk 10 by the elastic restoring force thereof.

That is, the return spring 320 is elastically deformed when the external force is provided to the brake pad 200. Thereafter, when the external force applied to the brake pad 200 is removed, the return spring 320 is restored to its original state by its elastic restoring force. Accordingly, the brake pad 200 can be smoothly spaced apart from the brake disk 10.

An elastic induction part 323 for introducing elastic deformation is formed in the return spring 320. The elastic induction part 323 has a hole part shape, and may be provided as a plurality of elastic induction parts that are formed in the return spring 320 in a way to be spaced apart from each other. Accordingly, the elastic restoring force of the return spring 320 can be increased because the return spring 320 is easily elastically deformed when the return spring 320 is elastically deformed.

The return coupling part 330 is connected to the return spring 320 and coupled with the torque member 100. The return coupling part 330 is formed to bend and extend from the return spring 320 to the torque member 100, and is coupled with a coupling groove 110 of the torque member 100.

The return spring 320 includes a first return spring 321 and a second return spring 322. The first return spring 321 is connected to a first return mounting part 311 of the return mounting part 310. The elastic induction part 323 is formed in the first return spring 321. The first return spring 321 may be elastically deformed.

The second return spring 322 is formed to bend and extend from the first return spring 321 in a way to face the first return spring 321, and is connected to the return coupling part 330. The second return spring 322 may be elastically deformed. The elastic induction part 323 is formed in the second return spring 322.

The return part 300 further includes an elastic support part 340. The elastic support part 340 is connected to the return mounting part 310 and brought into contact with the torque member 100, and supports the brake pad 200 by pushing the brake pad 200 by an elastic restoring force thereof.

When placed between a pad protrusion 212 of the brake pad 200 and the torque member 100, the elastic support part 340 is restored to its original state by its elastic restoring force and supports the brake pad 200 by upward (on the basis of FIG. 2) pushing the brake pad 200. Accordingly, the return part 300 guides a movement of the brake pad 200 in the state in which the return part 300 has elastically supported the brake pad 200.

The brake pad 200 includes the back plate 210 and a friction member 220. The return mounting part 310 is mounted on the back plate 210. The friction member 220 is connected to the back plate 210, and is brought into contact with the brake disk 10. The friction member 220 is made of an elastic material, and is coupled with a back plate body 211 of the back plate 210.

The back plate 210 includes the back plate body 211 and the pad protrusion 212. The friction member 220 is coupled with the back plate body 211. The pad protrusion 212 is formed to protrude from each of both sides of the back plate body 211. The return mounting part 310 is mounted on the pad protrusion 212. That is, the pad protrusion 212 is provided as a pair of pad protrusions 212, and the return mounting parts 310 of the return parts 300 are mounted on the pair of pad protrusions 212, respectively. Accordingly, the return parts 300 can uniformly provide return power to the brake pad 200.

A coupling hole 315 is formed in the return mounting part 310. A coupling protrusion 212e coupled with the coupling hole 315 is formed in the pad protrusion 212. In this case, the coupling protrusion 212e is provided as a pair of coupling protrusions 212e formed in the pad protrusions 212, respectively, in a way to be spaced apart from each other. The coupling holes 315 and the coupling protrusions 212e are formed to have the same number. The coupling protrusion 212e is coupled with the coupling hole 315.

The return mounting part 310 includes the first return mounting part 311, a second return mounting part 312, a third return mounting part 313, and a fourth return mounting part 314. The first return mounting part 311 is connected to the return spring 320, and faces a first surface 212a of the pad protrusion 212. The first return spring 321 of the return spring 320 is formed at one end of the first return mounting part 311 in a way to be bent and extended from the first return mounting part 311. The second return mounting part 312 to be described later is connected to the other end of the first return mounting part 311.

The second return mounting part 312 is formed to bend and extend from the first return mounting part 311 in a way to face a second surface 212b of the pad protrusion 212. Any one of the pair of coupling holes 315 is formed in the second return mounting part 312. The second surface 212b includes any one of the pair of coupling protrusions 212e.

The third return mounting part 313 is formed to bend from the second return mounting part 312 to one side thereof, and surrounds a third surface 212c of the pad protrusion 212. The third return mounting part 313 connects the second return mounting part 312 and the fourth return mounting part 314. In this case, an interval between the first return mounting part 311 and the third return mounting part 313 may be the same as an interval between the second surface 212b and a fourth surface 212d of the pad protrusion 212.

The fourth return mounting part 314 is formed to bend and extend from the third return mounting part 313 in a way to face the fourth surface 212d of the pad protrusion 212. The other of the pair of coupling holes 315 is formed in the fourth return mounting part 314. The fourth surface 212d includes the other of the pair of coupling protrusions 212e.

An operation and effects of the brake apparatus according to an embodiment of the present disclosure is described below with reference to FIGS. 9 and 10.

When a driver manipulates a brake pedal (not illustrated), a piston (not illustrated) pressurizes the brake pad 200 toward the brake disk 10 by hydraulic pressure. As described above, as the brake pads 200 are closely attached to and rubbed against the brake disk 10, a braking power is generated. At this time, the return parts 300 mounted on the brake pads 200 are elastically deformed.

Specifically, when an external force is provided to the brake pads 200, the brake pads 200 are moved toward the brake disk 10. Accordingly, the return springs 320 of the return parts 300 mounted on the pad protrusions 212 of the back plates 210 are elastically deformed. At this time, the brake pads 200 are moved on the torque member 100 in the state in which the brake pads 200 have been elastically supported by the elastic support parts 340 of the return parts 300 (refer to FIG. 10A).

Thereafter, when the braking power is released, if a driver does not manipulate the brake pedal, the pressurization of the piston on the brake pads 200 is released. At this time, the elastic support parts 340 of the return parts 300 provide elastic restoring forces to the brake pads 200 so that the brake pads 200 are sufficiently spaced apart from the brake disk 10.

Specifically, when the external force provided to the brake pads 200 is released, the return parts 300 are restored to their original states by the elastic restoring forces of the return springs 320 of the return parts 300. Accordingly, the brake pads 200 are moved to a side opposite to the brake disk 10 and are spaced apart from the brake disk 10. At this time, the brake pads 200 are moved on the torque member 100 in the state in which the brake pads 200 have been elastically supported by the elastic support parts 340 of the return parts 300 (refer to FIG. 10B).

In the brake apparatus 1 according to the present disclosure, the return parts 300 play a role as pad liners and return the brake pads 200 to their original positions by providing elastic restoring forces to the brake pads 200. Accordingly, since a pad liner is not required unlike a conventional technology, a cost for parts can be reduced because the number of parts is reduced and an assembly time can be reduced because an assembly process is simplified.

In addition, disadvantages attributable to the pad liner, such as the deformation of the pad liner and noise occurring due to an operation of the brake pad on the pad liner, can be prevented compared to a conventional technology for providing return power to a brake pad through the pad liner including the return part.

The present disclosure has been described above based on the embodiments illustrated in the accompanying drawings, but the embodiments are merely illustrative. A person having ordinary knowledge in the art to which the present disclosure pertains will understand that various modifications and other equivalent embodiments are possible from the embodiments.

Accordingly, the true technical range of protection of the present disclosure should be determined by the technical spirit of the claims.

What is claimed is:

1. A brake apparatus for a vehicle, comprising:
a torque member to surround a brake disk;
a pair of brake pads disposed in the torque member in a way to face each other; and
a plurality of return parts mounted on the pair of brake pads, coupled with the torque member, guides movements of the pair of brake pads, and returns the pair of brake pads to their original positions by elastic restoring forces thereof,
wherein each of the plurality of return parts comprises:
a return mounting part mounted on one of the pair of brake pads;
a return spring connected to the return mounting part and returns the one of the pair of brake pads to its original position by the elastic restoring force thereof; and
a return coupling part connected to the return spring and coupled with the torque member,
wherein each of the pair of brake pads comprises:
a back plate on which the return mounting part is mounted; and
a friction member connected to the back plate and contacts the brake disk,
wherein the back plate comprises:
a back plate body with which the friction member is coupled; and
a pad protrusion protruding from each of both sides of the back plate body and having the return mounting part mounted thereon,
wherein:
the return mounting part includes one or more coupling holes, and
the pad protrusion includes one or more coupling protrusions coupled with the one or more coupling holes,
wherein:
the one or more coupling protrusions is a pair of coupling protrusions disposed in the pad protrusion in a way to be spaced apart from each other, and
a number of the one or more coupling holes is the same as a number of the one or more coupling protrusions,
wherein the return mounting part further comprises:
a first return mounting part connected to the return spring and faces a first surface of the pad protrusion;
a second return mounting part bending and extending from the first return mounting part in a way to face a second surface of the pad protrusion and having any one of a pair of the one or more coupling holes;
a third return mounting part bending from the second return mounting part to one side thereof and surrounds a third surface of the pad protrusion; and
a fourth return mounting part bending and extending from the third return mounting part in a way to face a fourth surface of the pad protrusion and having the other of the pair of the one or more coupling holes.

2. The brake apparatus of claim 1, wherein an elastic induction part to induce elastic deformation is disposed in the return spring.

3. The brake apparatus of claim 1, wherein each of the plurality of return parts further comprises an elastic support part connected to the return mounting part, the elastic support part contacts the torque member, and supports the one of the pair of brake pads by pushing the one of the pair of brake pads by the elastic restoring force thereof.

4. The brake apparatus of claim 1, wherein the return coupling part bends and extends from the return spring to the torque member, and is coupled with a coupling groove of the torque member.

5. The brake apparatus of claim 1, wherein:
the second surface comprises any one of the pair of the coupling protrusions, and
the fourth surface comprises the other of the pair of coupling protrusions.

* * * * *